United States Patent

Meyers et al.

[11] Patent Number: 5,518,739
[45] Date of Patent: May 21, 1996

[54] CHEWING GUM CONTAINING LOW LEVELS OF MALTODEXTRIN

[75] Inventors: Marc A. Meyers, Naperville; Mansukh M. Patel, Downers Grove; Michael P. Russell, Chicago; David W. Record, River Forest, all of Ill.

[73] Assignee: The Wm. Wrigley Jr. Company, Chicago, Ill.

[21] Appl. No.: 278,378

[22] Filed: Jul. 20, 1994

[51] Int. Cl.$^6$ .................................................... A23G 3/30
[52] U.S. Cl. ................................................ 426/3; 426/658
[58] Field of Search ........................................ 426/3–6, 658

[56] References Cited

U.S. PATENT DOCUMENTS

| | | | |
|---|---|---|---|
| 4,065,578 | 12/1977 | Reggio et al. | 426/3 |
| 4,208,431 | 6/1980 | Friello et al. | 426/3 |
| 4,238,475 | 12/1980 | Witzel et al. | 426/3 |
| 4,271,198 | 6/1981 | Cherukuri et al. | 426/3 |
| 4,497,832 | 2/1985 | Cherukuri et al. | 426/5 |
| 4,574,091 | 3/1986 | Steensen et al. | 426/548 |
| 4,579,738 | 4/1986 | Cherukuri et al. | 426/3 |
| 4,590,075 | 5/1986 | Wei et al. | 426/5 |
| 4,604,287 | 8/1986 | Glass et al. | 426/15 |
| 4,725,441 | 2/1988 | Porter et al. | 424/479 |
| 4,741,910 | 5/1988 | Karwowski et al. | 426/285 |
| 4,753,805 | 6/1988 | Cherukuri et al. | 426/5 |
| 4,828,841 | 5/1989 | Porter et al. | 424/479 |
| 4,927,646 | 5/1990 | Jenner et al. | 426/96 |
| 5,139,798 | 8/1992 | Yatka et al. | 426/5 |
| 5,236,719 | 8/1993 | Meyers et al. | 426/3 |
| 5,296,244 | 3/1994 | Yatka | 426/3 |

FOREIGN PATENT DOCUMENTS

| | | |
|---|---|---|
| 0094088A1 | 11/1983 | European Pat. Off. . |
| 0237266A2 | 9/1987 | European Pat. Off. . |
| 0252874A2 | 1/1988 | European Pat. Off. . |
| 0335852A1 | 4/1989 | European Pat. Off. . |
| 0487187A1 | 5/1992 | European Pat. Off. . |
| 0485304A2 | 5/1992 | European Pat. Off. . |
| 0497439A1 | 8/1992 | European Pat. Off. . |
| 0545890A3 | 6/1993 | European Pat. Off. . |
| 75112 | 9/1988 | Israel . |
| 61-173748 | 8/1986 | Japan . |
| 62-146562 | 6/1987 | Japan . |
| 62-151139 | 7/1987 | Japan . |
| 62-158455 | 7/1987 | Japan . |
| 63-248348 | 10/1988 | Japan . |
| 4-60619 | 9/1992 | Japan . |
| 850209 | 1/1985 | South Africa . |
| 2013473 | 8/1979 | United Kingdom . |
| 2036750 | 7/1980 | United Kingdom . |
| WO92/09208 | 6/1992 | WIPO . |
| WO93/05663 | 4/1993 | WIPO . |
| WO93/09678 | 5/1993 | WIPO . |
| WO93/17578 | 9/1993 | WIPO . |
| WO93/17576 | 9/1993 | WIPO . |
| WO93/17579 | 9/1993 | WIPO . |
| WO93/17580 | 9/1993 | WIPO . |

*Primary Examiner*—Jeanette Hunter
*Attorney, Agent, or Firm*—Willian Brinks Hofer Gilson & Lione; Steven P. Shurtz

[57] ABSTRACT

A chewing gum composition is disclosed that contains about 0.1% to about 0.6% maltodextrin. The maltodextrin provides an initial stiffness so that the gum can be easily wrapped. However, at the low levels used, the maltodextrin does not have a significant impact on the chew properties of the gum.

20 Claims, No Drawings

CHEWING GUM CONTAINING LOW LEVELS OF MALTODEXTRIN

BACKGROUND OF THE INVENTION

The present invention relates to improved compositions of chewing gum. More particularly, the invention relates to improving the processability of chewing gum by the use of low levels of maltodextrin.

The texture of chewing gum is generally controlled by the amount of moisture it contains and the carbohydrates or polyols used to produce the gum. For sugar gum, the carbohydrates usually come from corn syrup and sugar, and for sugarfree gum, the carbohydrates comprise polyols, such as from sorbitol liquid and hydrogenated starch hydrolyzate (HSH) solutions. The moisture of the gum composition is controlled by varying the level and moisture content of the syrup, sorbitol liquid or HSH solution. Also, texture can be controlled by varying the level of the glycerin softener or other softeners used in the gum. The texture of the gum is also affected by the gum base (soft vs. hard) and flavor type and level (plasticizying vs. non-plasticizing—low vs. high).

In recent years, efforts have been devoted to producing gums that have high flavor levels, and to produce gums with wax-free gum bases. For example the following PCT applications disclose wax-free chewing gums: application Ser. Nos. US93/017580; US93/017578; US93/017579; and US93/017576. The following U.S. patent applications disclose chewing gum compositions with high flavor levels: Ser. Nos. 08/226,667; 08/226,463; 08/226,658; and 08/242,301.

In these newer, more recent gum formulations, the gum base and/or increased flavor levels have had a softening effect on the gum. Consequently, lower levels of glycerin, or moisture containing syrup, sorbitol liquid, or HSH solution would normally be used. However, acceptable lower levels have not given gum a sufficiently increased toughness for processing. Further reduction in the level of glycerin or moisture containing syrup, sorbitol liquid or HSH solutions causes gum to be too dry and cracks easily. The low toughness or softness causes problems with the gum as it is fed to high speed wrapping machines.

Maltodextrin is approved for use in food products in the U.S. by the USFDA. U.S. Pat. No. 4,604,287 discloses a low moisture chewing gum that contains 0.75% to 6% maltodextrin to produce a gum with an initial soft-short texture which, upon chewing, produces a soft, elastic-cohesive chewing gum.

Maltodextrin is a common encapsulating agent for flavors and high intensity sweeteners. Several patents disclose the use of maltodextrin encapsulated ingredients in chewing gum. For example, U.S. Pat. No. 5,139,798 discloses the use of a codried sucralose and maltodextrin mixed with polyvinyl acetate for use in chewing gum.

PCT Publication No. WO 93/5663 discloses the use of ingestible dextrin with aspartame (APM) in chewing gum.

SUMMARY OF THE INVENTION

Unexpectedly, it has been discovered that a low level of maltodextrin added to the gum formulations increases the toughness of the gum to sufficient levels to improve wrapping efficiency without having a significant effect on the gum's chew characteristics.

In a first aspect, the invention is a chewing gum composition comprising about 5% to about 95% gum base, about 5% to about 95% bulking and sweetening agents, about 0.1% to about 10% flavoring and about 0.1% to about 0.6% maltodextrin.

In a second aspect, the invention is a process for producing a chewing gum comprising the steps of providing gum base comprising about 5% to about 95% of the gum composition, providing bulking and sweetening agents comprising about 5% to about 95% of the gum composition, providing flavoring comprising about 0.1% to about 10% of the gum composition, providing maltodextrin comprising about 0.1% to about 0.6% of the gum composition and combining the gum base, bulking and sweetening agents, flavoring and maltodextrin to form the chewing gum composition.

In a third aspect, the invention is a method of making and wrapping chewing gum sticks comprising the steps of combining gum base, bulking and sweetening agents, flavoring and maltodextrin to form a chewing gum composition comprising about 0.1% to about 0.6% maltodextrin and having a Taber stiffness value of between about 15 and about 40 at 24 hours after mixing, forming the chewing gum composition into sticks, and wrapping the sticks while the Taber stiffness value of the composition is above about 15.

DETAILED DESCRIPTION OF THE PREFERRED EMBODIMENTS OF THE INVENTION

As used herein, the term "chewing gum" also includes bubble gum and the like. Unless otherwise specified, all percentages used herein are weight percents.

Maltodextrin is a carbohydrate bulking agent that is low in sweetness intensity. Typical maltodextrins are made by acid and/or enzyme hydrolysis of starches. They are hydrolyzed to a Dextrose Equivalent (D.E.) of about 4–27 and are typically spray dried to a powder. They are also readily digestible since the glucose polymer consists essentially of $\alpha$-1,4 bonds between glucose molecules. For this reason, and since maltodextrin also contains some dextrose, maltose, and maltotriose (DP1, DP2, DP3), it could be considered a sugar and will cause dental caries. Thus maltodextrins may preferably be used in sugar type gum formulations.

In order to use maltodextrins in a sugarfree gum, the maltodextrins would have to be treated to remove dextrose, maltose, and maltotriose such as by fermentation, as was disclosed for indigestible dextrin in copending application Ser. No. 08/211,197 (based on PCT Publication No. WO 93/5663) and U.S. Pat. No. 5,236,719, both incorporated herein by reference. The purified maltodextrin will still remain digestible, and may be hydrolyzed by salivary alpha amylase to fermentable carbohydrates, but it could be used to give reduced dental caries by reducing plaque pH drop. Also, depending on the definition by various countries, purified maltodextrin may be considered sugarfree or carbohydrate modified.

Removal of the fermentable components can be done by yeast fermentation, various types of chromatography, including liquid chromatography and gel permeation chromatography, ultrafiltration, and the use of glucose oxidase and maltase enzyme systems.

The yeast fermentation process is one method of eliminating fermentable components from maltodextrin. The process involves the following steps:

1) Prepare a 20% solution of maltodextrin in water and adjust the pH of the solution to 4–4.5.
2) Add 0.5% Bakers Yeast (by weight of maltodextrin) and stir constantly, at 20°–35° C. for 4–16 hours or until all the glucose and maltose are gone as analyzed by HPLC.
3) When completed, bring the solution to a boil for 5–10 minutes to inactivate the yeast.
4) Filter out the insoluble portion.
5) Evaporate, freeze dry or spray dry the filtrate.
6) Optionally, the filtrate may be decolorized by treatment with activated carbon and/or treated through an ion-exchange column to remove degraded protein and to deionize the filtrate.

Indigestible dextrin, such as Fibersol from Matsutani, is classified by the USFDA for allowance in food as a maltodextrin because it generally meets the USFDA definition of a maltodextrin. Although it may be considered a maltodextrin, it is not typical of conventional maltodextrins. Although it has a D.E. in the same range (about 4 to 27) as maltodextrin, indigestible dextrin has linkages besides the α-1,4 bonds of maltodextrin, for example α-1,6, β-1,2, β-1,3 and β-1,6. For purpose of the present invention, and as used in the claims, maltodextrin includes indigestible dextrin, such as the indigestible dextrins disclosed in PCT Publication No. WO 93/5663. Also, indigestible dextrin and conventional maltodextrin may together be considered as α-D-glucose polysaccharides.

The use of low levels of maltodextrin in a chewing gum has unexpectedly been shown to offer unique advantages. A low level of maltodextrin added to the gum formula increases the toughness of the gum to sufficient levels to improve wrapping efficiency without having a significant effect on chew characteristics. This level of maltodextrin is about 0.1 to about 0.6% of the gum. Preferred levels are about 0.2 to about 0.5% maltodextrin in gum.

According to U.S. Pat. No. 4,604,287, maltodextrin used at a level of about 0.75% and above gives gum an initial non-cohesive (short) texture. However, preferred gums of the present invention have an initial soft, cohesive texture.

Any maltodextrin may be used that is a dry powder (less than 6% moisture) and has a D.E. in the range of about 4–27. The preferred D.E. range is about 7–24, and the most preferred D.E. is in the range of about 10–17.

Recent advances use hydrogenated starch hydrolyzates (HSH) and glycerin preblended and coevaporated to reduce moisture in some sugar-free gum formulations. Maltodextrin may be used in gum formulations with hydrogenated starch hydrolyzates (HSH) without preblending with glycerin and coevaporation. The increased toughness of the inventive formulation reduces the need to keep moisture at a minimum.

As noted earlier, maltodextrin is often used as an encapsulating or agglomerating agent. Maltodextrin may also be used to absorb other ingredients. Maltodextrin may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with maltodextrin may improve the sweetener's shelf-life. These encapsulated flavors and/or sweeteners may be added to chewing gum. It is believed that the maltodextrin used in such encapsulations, if used at the proper levels, may provide the initial toughening desired for easy wrappability. However, in the preferred embodiment, the maltodextrin added to provide stiffness is in a form where it is not bound with any other gum ingredient.

The maltodextrin may readily be incorporated into a chewing gum composition. The remainder of the chewing gum ingredients are noncritical to the present invention. That is, the maltodextrin can be incorporated into chewing gum formulations in a conventional manner. As noted above, however, typically the invention will be utilized in conjunction with soft gum bases and soft gum formulations, especially with high flavor levels.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% of the gum. More preferably the insoluble gum base comprises between 10 and 50% of the gum and most preferably about 20 to about 35% of the gum.

The gum base typically also includes a filler component. The filler component may be calcium carbonate, magnesium carbonate, talc, dicalcium phosphate or the like. The filler may constitute between about 5 and about 60% of the gum base. Preferably, the filler comprises about 5 to about 50% of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 95%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15% of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the maltodextrin of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The maltodextrin of the present invention can also be used with aspartame or other high-intensity sweeteners, as well as commonly known sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the maltodextrin of the present invention can also be used in combination with coated or uncoated high-intensity sweeteners, such as acesulfame K, or the salts of acesulfame, cyclamate and its salts, saccharin and its salts, alitame, sucralose, thaumatin, monellin, dihydrochalcones, stevioside, glycyrrhizin and combinations thereof.

High-intensity sweeteners may also be modified to control their release in chewing gum formulations containing maltodextrin. This can be controlled by various methods of encapsulation, agglomeration, absorption, or a combination of methods to obtain either a fast or slow release of the sweetener. Sweetener combinations, some of which may be synergistic, may also be included in the gum formulations containing maltodextrin.

A flavoring agent may be present in the chewing gum in an amount within the range of from about 0.1 to about 10%, and preferably, for high flavor level gums, from about 1.5 to about 4% of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with any syrup and a portion of the bulking agent/sweetener. Further portions of the bulking agent/sweetener may then be added to the mixer. A flavoring agent is typically added with the final portion of the bulking agent. High-intensity sweeteners are preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Although it is preferable to use maltodextrin in a sugar gum, and a purified maltodextrin in a sugarless gum formulation, either may be used in a gum formula at levels sufficient to provide initial stiffness.

Taber stiffness is a measurement of gum stiffness using a Taber V-5 Stiffness Tester, available from the Taber Instrument Corporation, North Tonawanda, N.Y., with the gum at room temperature. The higher the Taber value, the tougher the gum. Gums that have a Taber value of about 0–8 are very difficult to wrap, gums with a Taber value of 8–15 are moderately difficult to wrap, gums with Taber value of about 15–20 are moderately easy to wrap, and gums with a value of 20–40 wrap very easily. A preferred Taber stiffness value is in the range of about 25–30 at 24 hours after making the gum.

To demonstrate the invention, five sugar gum formulas were made with a wax-free gum base as follows:

| | % |
|---|---|
| Butyl elastomer (isoprene-isobutylene copolymer) | 8.1 |
| Polyisobutylene | 6.9 |
| Polyvinyl acetate | 21.7 |
| Glycerol esters of hydrogenated rosin | 10.5 |
| Terpene resin | 13.7 |
| Hydrogenated vegetable oil | 13.4 |
| Glycerol monostearate | 4.6 |
| Lecithin | 1.7 |
| Calcium carbonate | 19.1 |
| Color | 0.3 |
| | 100.0 |

The following examples used a maltodextrin having a D.E. of 17, sold under the tradename LODEX 15, available from American Maize Products Co.

COMPARATIVE EXAMPLE A AND EXAMPLES 1–2

The following laboratory gum formulations were made:

| | Comparative Ex. A | Ex. 1 | Ex. 2 |
|---|---|---|---|
| No Wax Base | 20.90 | 20.90 | 20.90 |
| Sugar | 62.76 | 62.51 | 62.26 |
| Corn Syrup (85% Solids) | 14.00 | 14.00 | 14.00 |
| Glycerin | 0.76 | 0.76 | 0.76 |
| Cinnamon Flavor | 1.40 | 1.40 | 1.40 |
| Color | 0.18 | 0.18 | 0.18 |
| Lodex 15 Maltodextrin | — | 0.25 | 0.50 |
| | 100.00 | 100.00 | 100.00 |

After 7 days, five samples of each formula were tested in a Taber Stiffness Tester. The average Taber stiffness value for the formulas were as follows:

| Comparative Example A | 16.6 |
|---|---|
| Example 1 | 22.2 |
| Example 2 | 25.6 |

Even though these tests were not conducted at 24 hours after mixing, and the Taber value may have changed during storage, it is expected from the similarities of the formulations and the fact that all samples were stored under the same conditions, that the Taber values at 24 hours would have shown the same increase in Taber stiffness due to the addition of low levels of maltodextrin as was evidenced by the 7-day testing.

COMPARATIVE EXAMPLE B AND EXAMPLE 3

In the next formulations, gum was made on a production scale. Two batches of the inventive formula of Example 3 were made.

|  | Comparative Ex. B | Ex. 3 |
|---|---|---|
| No Wax Base | 20.40 | 20.90 |
| Sugar | 62.71 | 62.26 |
| Corn Syrup (85% Solids) | 14.50 | 14.00 |
| Glycerin | 0.76 | 0.76 |
| Cinnamon Flavor | 1.45 | 1.40 |
| Color | 0.18 | 0.18 |
| Lodex 15 Maltodextrin | — | 0.50 |
|  | 100.00 | 100.00 |
| Average Taber Stiffness (N = 5) (24 Hrs.) | 16.7 | 38.9 (Batch 1) 27.4 (Batch 2) |

The comparative formulation, besides being slightly too soft for wrapping, was also considered very dry, scaly, and crumbly and caused problems in sheeting. There was also some difficulty in wrapping the comparative gum, but the inventive formulation, Example 3, wrapped very easily. It is not known why the two batches of Example 3 different in Taber stiffness. This variation is not normal. It could be due to cold start up if this batch with Taber at 38.9 was first. In either case, both batches have much higher Taber than Comparative Example B.

COMPARATIVE EXAMPLES C–D AND EXAMPLES 4–7

The following base formulation was used in these comparative and inventive examples, as well as in Comparative Examples E–F and Examples 8–9:

|  | % |
|---|---|
| Isobutylene-isoprene copolymer | 6.1 |
| Polyisobutylene | 4.9 |
| Terpene resins | 12.5 |
| High MW (55,000–80,000) polyvinyl acetate | 6.6 |
| Medium MW (25,000–55,000) polyvinyl acetate | 11.9 |
| Low MW (10,000–25,000) polyvinyl acetate | 15.3 |
| Glycerol esters of hydrogenated rosin | 5.9 |
| Glycerol monostearate | 8.0 |
| Hydrogenated vegetable oil | 1.2 |
| Lecithin | 3.0 |
| Triacetin | 0.9 |
| Calcium carbonate | 12.1 |
| Talc | 11.1 |
| Color | 0.5 |
|  | 100.0 |

The following laboratory gum formulations were made:

|  | Comparative Ex. C | Ex. 4 | Ex. 5 | Comparative Ex. D | Ex. 6 | Ex. 7 |
|---|---|---|---|---|---|---|
| Base | 26.0 | 26.0 | 26.0 | 26.0 | 26.0 | 26.0 |
| Sugar | 61.85 | 61.65 | 61.65 | 64.35 | 64.15 | 64.15 |
| Corn Syrup (80% solids) | 7.1 | 7.1 | 7.1 | 5.0 | 5.0 | 5.0 |
| Glycerin | 0.9 | 0.9 | 0.9 | 0.5 | 0.5 | 0.5 |
| Fruit Flavor | 2.45 | 2.45 | 2.45 | 2.45 | 2.45 | 2.45 |
| Encapsulated Sweeteners | 1.7 | 1.7 | 1.7 | 1.7 | 1.7 | 1.7 |
| Lodex 10* | — | 0.20 | — | — | 0.20 | — |
| Lodex 15** | — | — | 0.20 | — | — | 0.20 |

*Lodex 10 is a 10 D.E. maltodextrin from American Maize Co.
**Lodex 15 is a 15 D.E. maltodextrin from American Maize Co.

Based on sensory evaluation of the samples, compared to Comparative Example C, both Examples 4 and 5 were slightly tougher, but gave good quality gum. Similarly, both Examples 6 and 7 were drier and more crumbly than Examples 4 and 5 on a laboratory scale. However, as seen in the next examples, gum formulations with 5% syrup gave soft products on a production scale, requiring the use of maltodextrin to toughen the formulations.

COMPARATIVE EXAMPLES E–F AND EXAMPLES 8–9

The following fruit gum samples were made to evaluate the use of maltodextrin in these type of gum formulations on a production scale.

|  | Comparative Ex. E | Comparative Ex. F | Ex. 8 | Ex. 9 |
|---|---|---|---|---|
| Base | 26.00 | 26.00 | 26.00 | 26.00 |
| Sugar | 63.25 | 63.40 | 64.20 | 64.35 |
| Corn Syrup (80% Solids) | 5.00 | 5.00 | 5.00 | 5.00 |
| Glycerin | 0.50 | 0.50 | 0.50 | 0.50 |
| Fruit Flavor | 2.55 | 2.55 | 2.35 | 2.35 |
| Calcium Carbonate | 1.00 | 1.00 | — | — |
| Encapsulated Sweetener | 1.25 | 1.25 | 1.25 | 1.25 |
| Encapsulated APM | 0.45 | — | 0.45 | — |
| Encapsulated acesulfame K | — | 0.30 | — | 0.30 |
| Lodex 15 | — | — | 0.25 | 0.25 |
| Maltodextrin |  |  |  |  |
|  | 100.00 | 100.00 | 100.00 | 100.00 |
| Average Taber Stiffness (N = 10) (24 Hrs.) | 7.9 | 7.4 | 17.1 | 16.9 |

In these samples, calcium carbonate was eliminated from the inventive examples and the flavor level was slightly lower than the comparative examples. However, these differences are considered slight compared to the addition of 0.25% maltodextrin. The addition of maltodextrin increases the stiffness of the gum from a product very difficult to wrap to a product that processes more easily and can be wrapped moderately easily.

It is believed that beside maltodextrin, low levels of natural carbohydrate gums such as guar gum, cellulose derivatives such as carboxy methyl cellulose and hydroxypropyl methyl cellulose, gelatine and modified starches may be used to provide an initial stiffness without affecting the chew properties of the gum.

It should be appreciated that the compositions and methods of the present invention are capable of being exhibited in the form of a variety of embodiments, only a few of which have been illustrated and described above. The invention may be embodied in other forms without departing from its spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum composition comprising:
   a) about 5% to about 95% gum base;
   b) about 5% to about 95% bulking and sweetening agents;
   c) about 0.1% to about 10% flavoring; and
   d) about 0.1% to about 0.6% maltodextrin wherein the maltodextrin increases the toughness of the gum to sufficient levels to improve wrapping efficiency without having a significant effect on the gum's chew characteristics.

2. The chewing gum composition of claim 1 wherein the maltodextrin has a D.E. in the range of about 4 to 27.

3. The chewing gum composition of claim 1 wherein the maltodextrin has a D.E. in the range of about 7 to 24.

4. The chewing gum composition of claim 1 wherein the maltodextrin comprises about 0.2% to about 0.5% of the gum composition.

5. The chewing gum composition of claim 1 wherein the gum base is free of wax.

6. The chewing gum composition of claim 1 wherein the flavoring comprises about 1.5% to about 4% of the gum composition.

7. The chewing gum composition of claim 1 wherein the flavoring comprises a fruit flavor.

8. The chewing gum composition of claim 1 wherein the maltodextrin has a D.E. of between about 10 and about 17.

9. The chewing gum composition of claim 1 wherein the maltodextrin is freely admixed into the gum and is not bound with any other gum ingredient.

10. The chewing gum composition of claim 1 wherein the gum composition has a Taber stiffness value of between about 15 and about 40 at 24 hours after mixing.

11. The chewing gum composition of claim 1 wherein the composition has an initial soft, cohesive texture.

12. A process for producing a chewing gum comprising the steps of:
    a) providing gum base comprising about 5% to about 95% of the gum composition;
    b) providing bulking and sweetening agents comprising about 5% to about 95% of the gum composition;
    c) providing flavoring comprising about 0.1% to about 10% of the gum composition;
    d) providing maltodextrin comprising about 0.1% to about 0.6% of the gum composition; and
    e) combining the gum base, bulking and sweetening agents, flavoring and maltodextrin to form the chewing gum composition, wherein the maltodextrin increases the toughness of the gum to sufficient levels to improve wrapping efficiency without having a significant effect on the gum's chew characteristics.

13. The process of claim 12 wherein the maltodextrin is provided in a powdered form and mixed as a powder with the other chewing gum composition ingredients.

14. The process of claim 12 wherein the maltodextrin has a D.E. of between about 4 and about 27.

15. The process of claim 12 wherein the maltodextrin has a D.E. of between about 10 and about 17.

16. The process of claim 12 wherein the maltodextrin comprises about 0.2% to about 0.5% of the gum composition.

17. The process of claim 12 wherein the maltodextrin comprises indigestible dextrin.

18. The process of claim 12 wherein the maltodextrin comprises D-glucose units linked essentially by $\alpha$-1,4 bonds.

19. A method of making and wrapping chewing gum sticks comprising the steps of:
    a) combining gum base, bulking and sweetening agents, flavoring and maltodextrin to form a chewing gum composition comprising about 0.1% to about 0.6% maltodextrin and having a Taber stiffness value of between about 15 and about 40 at 24 hours after mixing, the maltodextrin increasing the toughness of the gum to sufficient levels to improve wrapping efficiency without having a significant effect on the gum's chew characteristics;
    b) forming said chewing gum composition into sticks; and
    c) wrapping said sticks while the Taber stiffness value of the composition is above about 15.

20. The method of claim 19 wherein the composition comprises about 0.2% to about 0.5% maltodextrin.

* * * * *